E. H. ALLFREE & W. H. ENGLAND.
DERAILER.
APPLICATION FILED NOV. 8, 1915.

1,204,837.

Patented Nov. 14, 1916.
4 SHEETS—SHEET 1.

Witnesses:

Inventors:
Edwin H. Allfree
William H. England,
By Dyrenforth, Lee, Chritton & Wiles
Attys.

E. H. ALLFREE & W. H. ENGLAND.
DERAILER.
APPLICATION FILED NOV. 8, 1915.
1,204,837.
Patented Nov. 14, 1916.
4 SHEETS—SHEET 2.
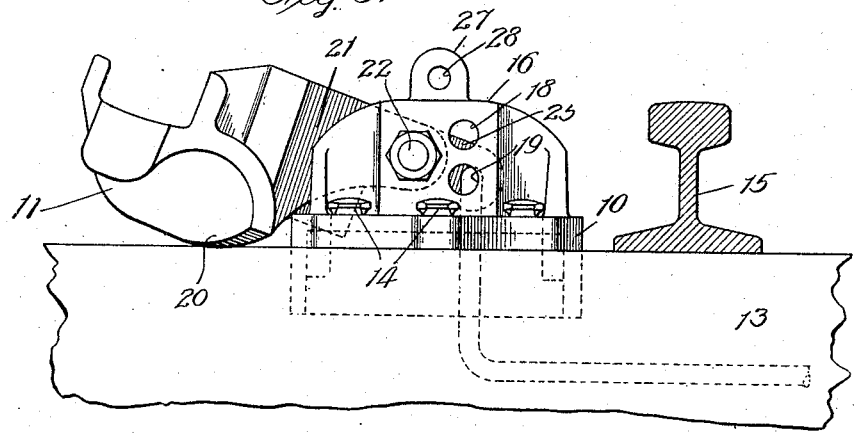
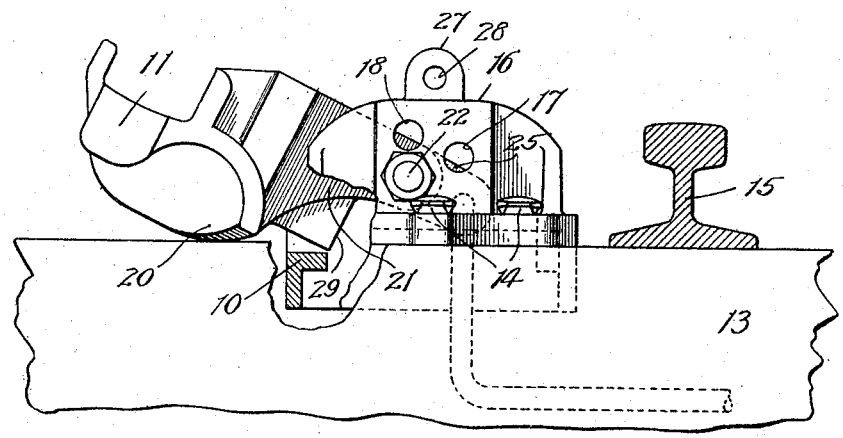
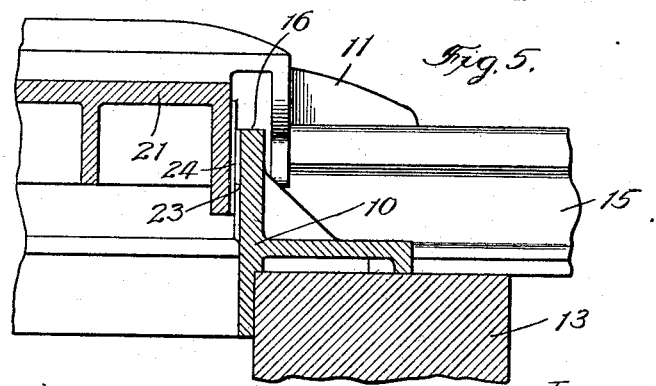

E. H. ALLFREE & W. H. ENGLAND.
DERAILER.
APPLICATION FILED NOV. 8, 1915.
1,204,837.
Patented Nov. 14, 1916.
4 SHEETS—SHEET 3.
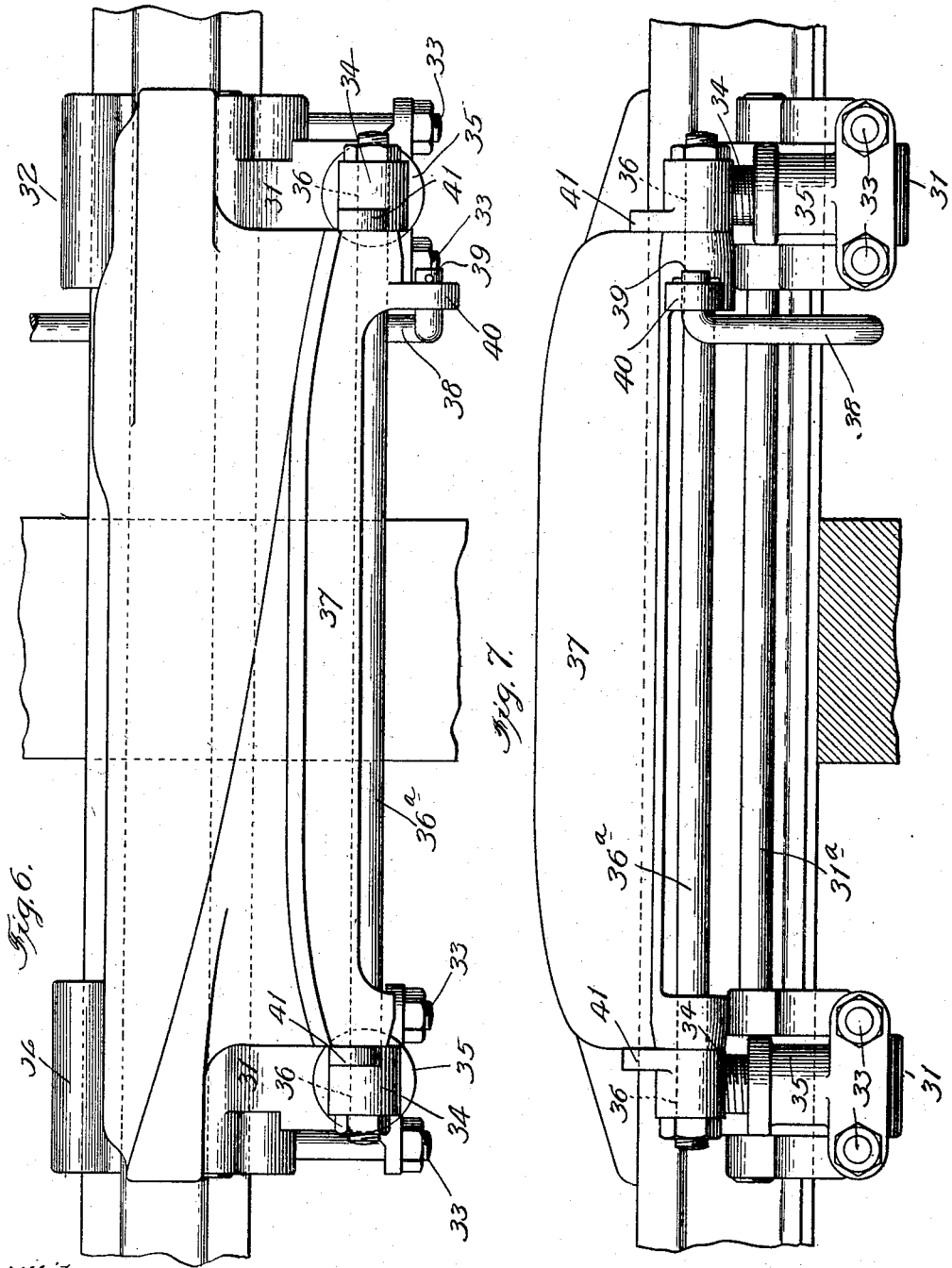

E. H. ALLFREE & W. H. ENGLAND.
DERAILER.
APPLICATION FILED NOV. 8, 1915.

1,204,837.

Patented Nov. 14, 1916.
4 SHEETS—SHEET 4.

Witnesses:

Inventors:
Edwin H. Allfree,
William H. England,
By Dyrenforth, Lee, Chritton and Wiles
Attys.

UNITED STATES PATENT OFFICE.

EDWIN H. ALLFREE, OF WILMETTE, AND WILLIAM H. ENGLAND, OF CHICAGO, ILLINOIS.

DERAILER.

1,204,837.　　　　　Specification of Letters Patent.　　Patented Nov. 14, 1916.

Application filed November 8, 1915. Serial No. 60,398.

*To all whom it may concern:*

Be it known that we, EDWIN H. ALLFREE and WILLIAM H. ENGLAND, citizens of the United States, residing, respectively, at Wilmette and Chicago, in the county of Cook and State of Illinois, have invented a new and useful Improvement in Derailers, of which the following is a specification.

Our invention relates to improvements in derailers of the general type involving a supporting structure which is secured to the ties or to the rail, or both and a derailer-block movably supported on said supporting structure to be moved into and out of derailing position.

Our objects, generally stated, are to provide improvements in derailers as hitherto manufactured, to the end that the operations attending their use will be productive of greater safety to the operators and to trains passing over the track, and structures of this character will be more effectively standardized; to reduce the number of different sizes of derailers required for use under varying conditions; to reduce the cost of installation; and to enhance the strength of derailer structures.

Figure 1:
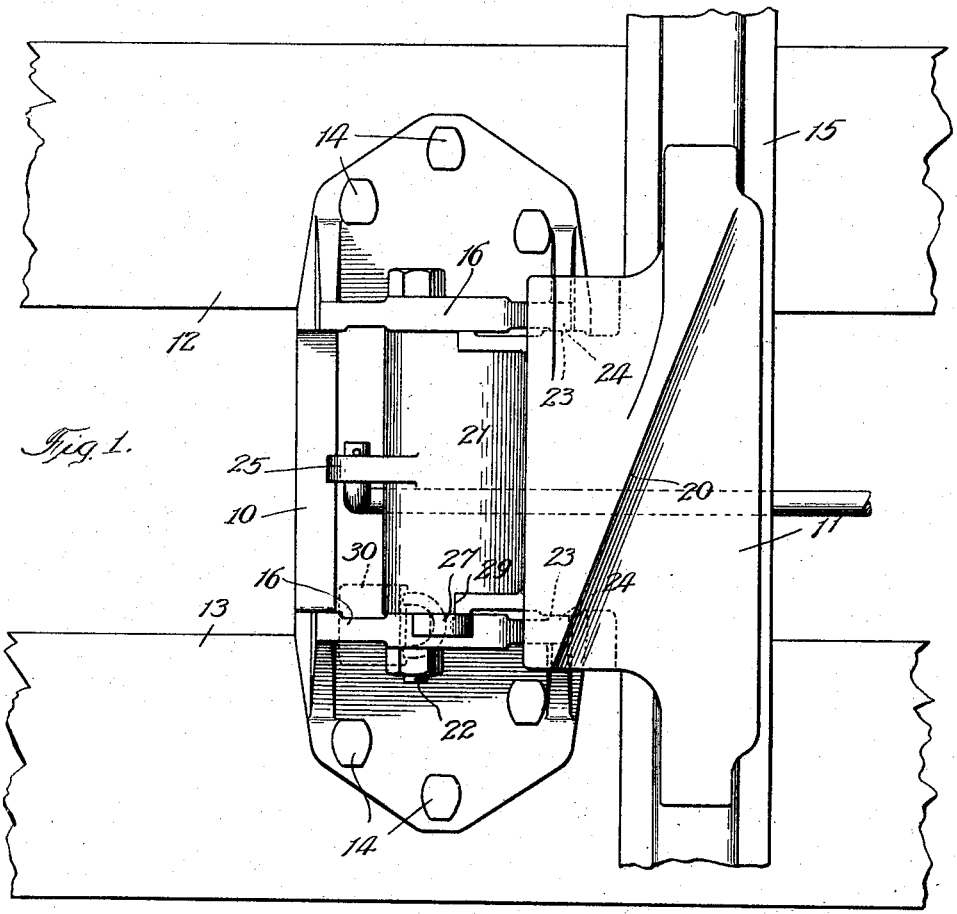
Figure 2:
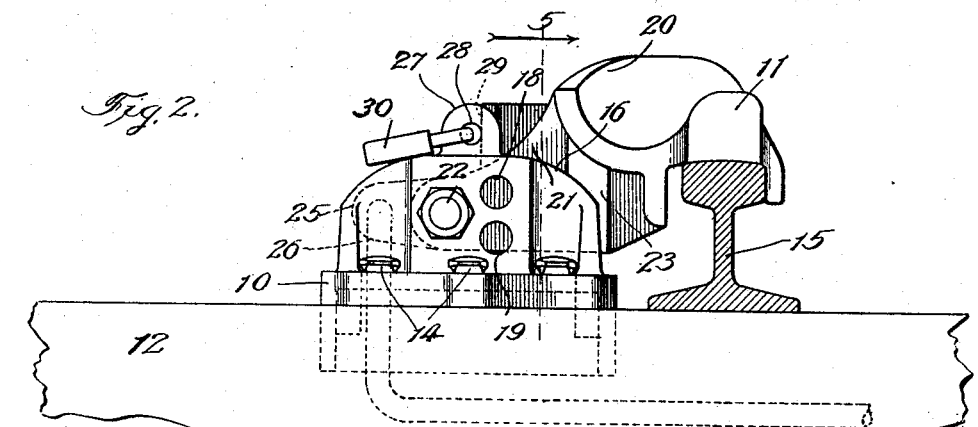
Figure 8:
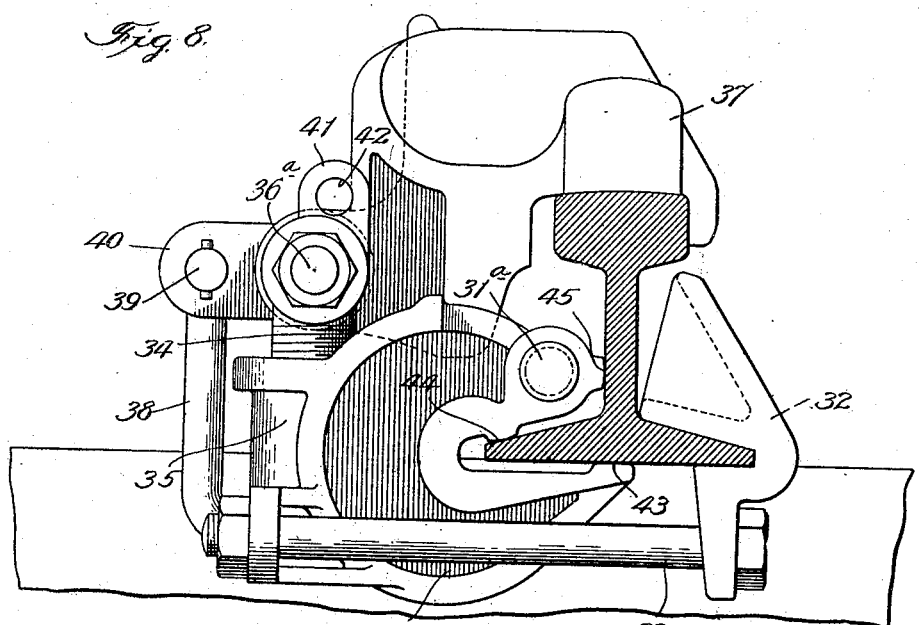
Figure 9:
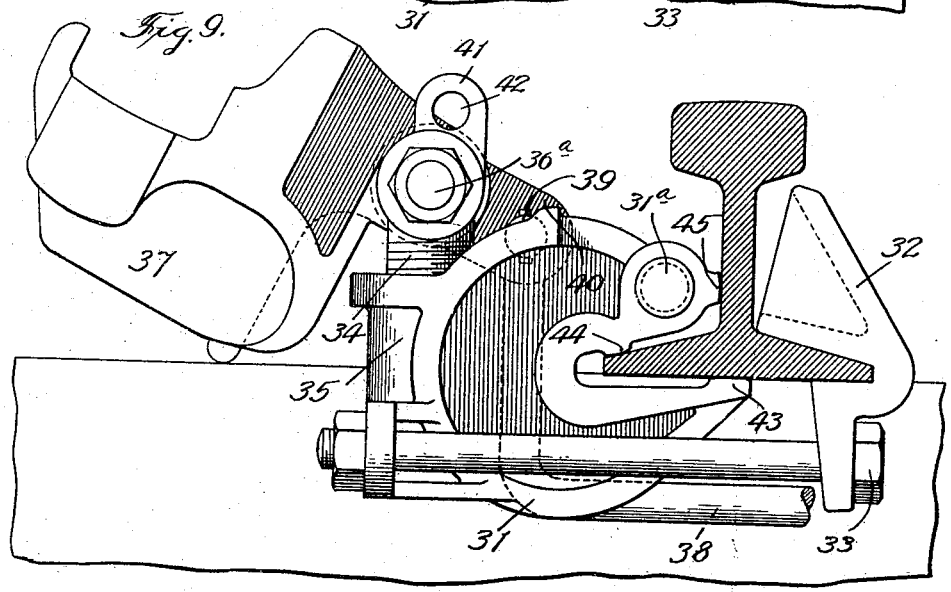

Referring to the accompanying drawings, Figure 1 is a plan view of a derailer embodying our improvements, the derailer shown being of the type which is adapted to be fastened to the upper surfaces of ties, and shown as applied to position on a road-bed. Fig. 2 is a view in end elevation of the derailer of Fig. 1, showing the rail in section, and the derailer-block in the position it occupies when in derailing position. Fig. 3 is a similar view showing the derailer-block swung out of derailing position. Fig. 4 is a view similar to Fig. 3 showing the block adjusted to a different position and the supporting structure turned end for end. Fig. 5 is an enlarged broken section taken at the line 5 on Fig. 2, and viewed in the direction of the arrow. Fig. 6 is a plan view of a derailer of the type adapting it to be secured directly to the rail, the derailer shown embodying our improvements and occupying derailing position. Fig. 7 is a view in side elevation of the structure shown in Fig. 6. Fig. 8 is an end view of the structure of Fig. 6, this view showing the rail in section; and Fig. 9, a view similar to Fig. 8 showing the derailer-block out of derailing position.

Referring particularly to Figs. 1, 2, 3, 4 and 5, a supporting member is represented at 10, this member having pivoted thereto a derailer-block 11. The supporting member 10 is preferably of such length that it will reach across from one tie, such as that represented at 12, to an adjacent tie, represented at 13, and be secured thereto as through the medium of spikes 14 which will be driven through openings in the ends of the member 10 and into the ties, the member 10 being positioned to extend lengthwise of the rail, as, for example, the one shown at 15 with which the derailer is to coöperate, and between this and the other rail of the track. The member 10 is provided toward its opposite ends with upwardly projecting standards 16 spaced apart and provided with apertures for receiving the bolts, or other means employed, for pivotally supporting the block 11 on the member 10. There are preferably three of the openings just referred to, in each of the standards 16, these openings being represented at 17, 18 and 19. The openings 17, one in each of the standards 16, are provided at one side of the median line of the supporting member 10 and the openings 18 and 19, provided in each of the standards 16, are disposed at the opposite side of said median line and are disposed a distance therefrom equal to the distance between the median line and the openings 17, the openings 18 and 19 being arranged preferably one below the other and above and below, respectively, the horizontal plane bisecting the openings 17. The derailer-block 11 which may be of any suitable construction and which, in the construction shown, is provided with a derailing flange 20, is provided with a laterally extending section 21 which extends between the standards 16 and at which the derailer 11 is pivotally supported through the medium of the bolt 22 extending therethrough and through registering ones of the openings 17, 18 and 19, as the case may be, the parts described being so constructed and arranged that the derailer-block 11 will comparatively snugly fit at surfaces 23 thereon against opposing surfaces 24 provided on the inner face of the standards 16, this feature of the construction being desirable inasmuch as the supporting member 10, which may be made relatively heavy, is thereby caused to materially relieve the pivot of the derailer of strain exerted against the device under the impact delivered against the block 11 by a train striking the end of this block.

The derailer-block is shown in Figs. 1 and 2 in the position it assumes when in derailing position, in which condition the block 11 rests at its under side upon the upper surface of the flange of the rail 15, and in Figs. 3 and 4 is shown in a position in which it is out of derailing position, or, in other words, is thrown back on its pivot to a position in which it is removed from the rail and is out of the path of movement of the train in passing over the track equipped therewith. It is customary to associate with the derailer, signal mechanism (not shown) operated by the derailer for indicating the position occupied by the block 11. To this end the extension 21 is provided at the section thereof removed from the portion of the block engaging the rail, with an arm 25 having pivotal connection with a rod 26 which in practice leads to a signal device (not shown) and operates the latter as is usual in constructions of this type.

In the preferred illustrated embodiment of our invention means are provided for locking the derailer-block both in and out of derailing position. The means shown in the structure illustrated in Figs. 1 to 5 inclusive, for effecting this, comprise an upwardly-extending lug 27 provided on one of the uprights 16 and containing an aperture 28 located approximately midway between the openings 17 and 18, a surface 29 on the derailer-block 11, and a padlock 30, or the like, adapted to extend through the opening 28 in the lug 27. In the construction illustrated in Figs. 1, 2 and 3 the derailer-block 11 is pivoted at openings 17, in which position of adjustment the block 11 is locked in derailing position by the padlock 30 opposing the surface 29, as shown in Fig. 2; and is locked out of derailing position by the padlock 30 opposing the opposite side of the derailer-block 11, as will be readily understood by an examination of Fig. 3. When the dimensions of the rail to which the derailer is to be applied are such that the pivoting of the block 11 at the opening 17 would not permit of the proper seating of the block 11 on the rail, the block 11 is pivoted at the sets of openings 18 or 19 as conditions render desirable, and in order to preserve the desired relation between the lug 27 and the surfaces of the derailer-block 11 with which the lock 30 coöperates, the member 10 is turned end for end, as illustrated in Fig. 4, this positioning of the member 10 in combination with the location of the lug 27 relative to the openings 17, 18 and 19 as described, preserving the relative locations of the lug 27 and the surfaces of the block 11 with which the lug coöperates. It will be noted from the foregoing that the derailer-block is adjustable in a vertical plane to different positions therein and thus may be caused to become properly seated on rails of widely differing heights.

Referring particularly to Figs. 6, 7, 8 and 9, the derailer device shown is of the type involving a supporting structure adapted to be clamped to the lower portion of the rail to be equipped with the device, and a derailer-block mounted on said supporting structure and adapted to be moved thereon into and out of derailing position. The supporting structure referred to is formed of a pair of similar members 31 spaced apart and connected together by a bolt 31$^a$ and adapted to straddle a flange of the rail, members 32 adapted to straddle the opposite side of the rail, and bolts 33 engaging the members 31 and 32 for clamping the supporting structure to the rail, the members 31 being provided with vertically adjustable bearing-members 34 which are in the form of studs having threaded engagement with socketed portions 35 of the members 31. The bearing-members 34 contain apertures 36 through which a bolt 36$^a$, extending through the derailer-block represented at 37, passes, this bolt forming a pivot for the said block and permitting the latter to be swung into and out of a position in which it rests upon the upper surface of the rail. The block 37 is shown as provided with means for actuating a signal device (not shown), these means comprising a rod 38, pivotally connected at one end, as indicated at 39, with a crank-arm 40 on the block 37 and extending at its opposite end to the signal device to be operated, as will be well understood in the art. A lug 41 is provided on one of the bearing-members 34 and contains an opening 42 for receiving a padlock, or other suitable locking device, not shown. The lug 41 is so positioned and the derailer block 37 so formed, that the block 37 will not present obstruction to the insertion of a padlock into the opening 42 in either position of the block 37, and will present surfaces which coöperate with a padlock so positioned, in either position of the derailer 37 for locking the latter in both positions, as will be readily understood from the drawings.

The feature of making the pivot for the block 37 adjustable vertically adapts the device to rails of different heights.

It is desirable that the members 31 be drawn, by means of the bolts 33, into rigid engagement with one side of the rail to provide the desired support for the derailer-block 37. It is furthermore desirable that the derailer devices be so constructed that when applied to rails of different sizes they will present the desired degree of rigidity. We have accomplished this in our improved construction by providing three-point contact of the members 31 with one side of the rail, and to this end the recesses in the members 31 at which the latter straddle the flange of the rail, is made large relative to the cross-sectional dimensions of the rail flange, and projections or bosses 43, 44 and 45 are provided, the bosses 44 on the upper walls of the recesses and adjacent to their inner ends, the bosses 43 on the lower walls of the recesses and near their outer ends, and the bosses 45 immediately above the recesses, the bosses 43 engaging the underside of the rail, the bosses 44 the upper surface of the rail flange, and the bosses 45 the web of the rail adjacent the said flange. The arrangement of the bosses referred to is such, as illustrated, as to insure three-point contact between the said portions of the rail and the members 31 within a relatively wide range of sizes of rails. The application of the supporting structure for the derailer-block 37 to different sizes of rails will, however, as will be manifest, cause the members 31, and consequently the members 34, to tilt slightly toward or away from the rail, depending on the dimensions of the latter. Thus the vertical position of the pivot of the derailer-block 37 will be altered, and in this connection the feature of adjustability of the derailer-block 37 in a vertical plane is of advantage, inasmuch as the tilting referred to may be compensated for and the block 37 afforded a firm seat on top of the rail.

While we have illustrated and described certain forms in which our invention may be embodied, we do not wish to be understood as intending to limit it thereto, as the same may be variously modified and altered without departing from the spirit of our invention.

What we regard as new and desire to secure by Letters Patent, is:

1. A derailer formed of a derailer-block, a supporting structure, means for pivotally supporting said block on said supporting structure adjustable to position the pivot of said block in different positions vertically, and means coöperating with said supporting structure and block for locking said block both in and out of derailing position.

2. A derailer formed of a derailer-block, a supporting structure, means for pivoting said block on said supporting structure adjustable horizontally and vertically to different positions, and means engaging said supporting structure in a vertical plane between the different positions of said adjustments of the block on the supporting structure and engaging said block both when in and out of derailing position for locking the latter in said positions.

3. A derailer formed of a derailer-block, a supporting structure containing a plurality of openings spaced apart horizontally and one disposed in a plane above the other, a pivoting device for pivoting said block on said supporting structure and adjustable in said openings to adjust said block vertically, and means engaging said supporting structure in a plane between said openings for locking said block in and out of derailing position.

4. A derailer formed of a derailer-block, a supporting structure containing sets of openings disposed in different horizontal and vertical planes, pivot devices adapted to be inserted into any of said sets of openings pivoting said block on said supporting structure, a lug on said supporting structure in a plane between said sets of openings, and a lock engaging said lug and coöperating with said block locking the latter both in and out of derailing position.

5. A derailer formed of a derailer-block, and a supporting structure therefor reversible end for end to position it with either side adjacent a rail and supporting said block in proper position relative to the rail and at different heights in the different positions of adjustment of said supporting structure.

6. A derailer formed of a derailer-block, a supporting structure therefor, means whereby said block may be supported at one height from an adjacent rail when said supporting structure is in one position relative to the rail, and means whereby said block may be supported at a different height when said supporting structure is positioned alongside the rail in a position in which it is turned end for end.

7. A derailer formed of a base adapted to be positioned at either of opposite sides thereof adjacent to a rail, a derailer-block, said base containing openings arranged in different vertical planes and staggered relative to each other, and pivoting means adapted to engage said block and engage any of said openings, for pivoting said block to said base to cause it to extend adjacent either side of said base.

8. A derailer comprising a derailer-block, a base, a stop on said base toward one end and adjacent one edge of said base, a second stop toward the opposite end of said base and adjacent its opposite edge, said block being adapted to be supported from said base to extend across either side thereof and coöperate with one or the other of said stops, depending upon the position of said block, with its points of connection with said base located substantially equi-distant from said stops, whereby the block occupies the same position relative to its coöperating stop in either of said positions of adjustment.

9. A derailer comprising a base provided at opposite sides with stops and containing two vertical rows of apertures arranged in staggered relation and substantially equi-distant from said stops, a derailer-block adapted to oppose, and coöperate with, either stop, depending on the direction in which the block extends from the base, and means engaging said block and adapted to engage any of said apertures for pivoting the block thereto.

10. A derailer comprising a base provided at opposite sides with stops, a derailer-block adapted to oppose and coöperate with either stop, depending on the direction in which the block extends from the base, and means adapted to pivotally support the block at any one of a number of points on said base disposed in staggered relation in series substantially equi-distant from said stops, to extend at opposite sides, respectively, of the base.

11. A derailer comprising a base containing apertures for spikes to fasten the base in place alongside a rail, arranged, when reversed end for end, to register with the spike holes previously made in the ties, a derailer-block, and means adapted to pivotally support the block at any one of a number of points on said base disposed in staggered relation in series, certain of the said points of pivotal support coöperating with said block when the block extends adjacent one side of said base, and the other of said points of pivotal support coöperating with said block when the latter extends adjacent the other side of said base and affording adjustment of the block to different heights of rails.

12. A derailer comprising a base containing apertures for spikes to fasten the base in place alongside a rail, arranged, when reversed end for end, to register with the spike holes previously made in the ties, a derailer-block, openings in said base arranged in two vertical series equi-distant from the said apertures, and means for supporting said block on said base at any one of the said openings, whereby said block may be caused to extend in the same position on the rail adjacent thereto in either position of said base.

13. A derailer comprising a base containing apertures for spikes to fasten the base in place alongside a rail, arranged, when reversed end for end, to register with the spike holes previously made in the ties, a derailer-block, openings in said base arranged in two vertical series equi-distantly spaced from said apertures in staggered relation to each other, and means for supporting said block on said base at any one of the said openings, whereby said block may be caused to extend in the same position on the rail adjacent thereto in either position of said base.

14. A derailer comprising a base containing apertures for spikes to fasten the base in place alongside a rail, arranged, when reversed end for end, to register with the spike holes previously made in the ties, a derailer-block, openings in said base arranged in two vertical series equi-distantly spaced from the said apertures and in staggered relation to each other, and means for pivotally supporting said block on said base at any one of the said openings, whereby said block may be caused to extend in the same position on the rail adjacent thereto in either position of said base.

15. A derailer comprising a base containing apertures for spikes to fasten the base in place alongside a rail, arranged, when reversed end for end, to register with the spike holes previously made in the ties, a derailer-block, openings in said base arranged in two vertical series equi-distant from the said apertures and in staggered relation, and means for pivotally supporting said block on said base at any one of said openings, whereby said block may be caused to extend in the same position on the rail adjacent thereto in either position.

16. A derailer formed of a base adapted to be positioned at either of opposite sides thereof adjacent to a rail, a derailer block, and means adapted to pivotally support the block at any one of a number of points on said base disposed in staggered relation in series, certain of said points of pivotal support coöperating with said block when the block extends adjacent one side of said base, and the other of said points of pivotal support coöperating with said block when the latter extends adjacent the other side of said base and affording adjustment of the block to different heights of rails.

EDWIN H. ALLFREE.
WILLIAM H. ENGLAND.

In presence of—
  D. C. Thorsen,
  O. C. Avisus.

Copies of this patent may be obtained for five cents each, by addressing the "Commissioner of Patents, Washington, D. C."